United States Patent
Le et al.

(10) Patent No.: US 9,430,834 B2
(45) Date of Patent: Aug. 30, 2016

(54) VISUAL PERCEPTION MATCHING COST ON BINOCULAR STEREO IMAGES

(71) Applicant: Nokia Corporation, Espoo (FI)

(72) Inventors: Binh Huy Le, Houston, TX (US); Daniel A. Vaquero, Sunnyvale, CA (US); Timo Ahonen, Redwood City, CA (US)

(73) Assignee: Nokia Corporation, Espoo (FI)

( * ) Notice: Subject to any disclaimer, the term of this patent is extended or adjusted under 35 U.S.C. 154(b) by 247 days.

(21) Appl. No.: 14/159,001

(22) Filed: Jan. 20, 2014

(65) Prior Publication Data
US 2015/0206307 A1   Jul. 23, 2015

(51) Int. Cl.
*G06T 7/00* (2006.01)

(52) U.S. Cl.
CPC ........... *G06T 7/0026* (2013.01); *G06T 7/0022* (2013.01); *G06T 2207/10012* (2013.01); *G06T 2207/20228* (2013.01)

(58) Field of Classification Search
CPC .......... G06T 2207/10012; G06T 2207/10021; G06T 7/002; G06T 15/205; G06T 7/0075; G06T 7/0044; G06T 7/0065; H04N 13/0022; H04N 7/0135; H04N 13/0011; H04N 19/176; G06K 9/6215; G03B 35/00
See application file for complete search history.

(56) References Cited

U.S. PATENT DOCUMENTS

| | | |
|---|---|---|
| 2012/0162193 A1 | 6/2012 | Bae et al. |
| 2012/0163703 A1 | 6/2012 | Lim et al. |
| 2014/0049657 A1* | 2/2014 | Fukunishi ............ H04N 5/2355 348/208.4 |

FOREIGN PATENT DOCUMENTS

EP    2477158 A1    7/2012

OTHER PUBLICATIONS

Farin et al. *View Interpolation Along a Chain of Weakly Calibrated Cameras* Jan. 1, 2006, pp. 1-4, XP055017557 URL: http://vca.ele.tue.nl/publications/data/Farin2006d.pdf [retrieved on Jan. 25, 2012].
Liang Wang et al. *Stereoscopic Inpainting: Joint Color and Depth Completion from Stereo Images* Computer Vision and Pattern Recognition, 2008. CVPR 2008. IEEE Conference on, IEEE, Piscataway, NJ, USA, Jun. 23, 2008, pp. 1-8 XP031297262, ISBN: 978-1-4244-2242-5.
Szeliski, Richard, "Computer Vision" Algorithms and Applications, Microsoft Research, Nov. 11, 2013, 2 pgs.
Szeliski, Richard, "Computer Vision: Algorithms and Applications", Sep. 3, 2010, 14 pgs.
Vihavainen, Sami et al., "Video as memorabilia: User Needs for collaborative automatic mobile video production", ACM SIGCH Conference on Human Factors in Computer Systems, 2012, 5 pgs.
Wei, Chen-Hao, et al., "Novel Multi-View Synthesis from a Stereo Image Pair for 3 D Display on Mobile Phone", Aug. 30, 2013, 14 pgs.

* cited by examiner

*Primary Examiner* — Haixia Du
(74) *Attorney, Agent, or Firm* — Harrington & Smith (57) ABSTRACT

In a method, a first image of a subject is taken from a first viewpoint. The first image of the subject is composed of a first plurality of pixels. A second image of the subject is taken from a second viewpoint. The second image of the subject is composed of a second plurality of pixels. Pixels in the first plurality of pixels in the first image correspond to pixels in the second plurality of pixels in the second image. Corresponding pixels lie on first epipolar lines in the first image and on second epipolar lines in the second image. The first and second images are rectified to make the first and second epipolar lines parallel to one another and to place corresponding pixels in the first and second images on one of a plurality of pairs of common scanlines. For at least one pair of common scanlines, a corresponding pixel is found in the second image for each pixel in the first image such that a visual perception matching cost (VPMC) is minimized.

24 Claims, 6 Drawing Sheets

VISUAL PERCEPTION MATCHING COST ON BINOCULAR STEREO IMAGES

TECHNICAL FIELD

Various embodiments relate generally to image processing and to stereoscopic imaging, and relate more particularly to view interpolation and image in-painting from multiple views.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application, and is not admitted to be prior art by inclusion in this section. Abbreviations that may be found in the specification and/or the drawing figures are defined below at the end of the specification, but prior to the claims.

Various embodiments relate to stereoscopic imaging, and particularly to view interpolation and to image in-painting from multiple views.

In view interpolation, two images of the same scene taken from two different locations are used to estimate a new camera view of the scene appearing as if it had been captured from a viewpoint between the two locations. The two images may be taken, for example, simultaneously by two cameras, or sequentially by one camera which is moved from one location to the next after the first of the two images is taken.

Figure 1:
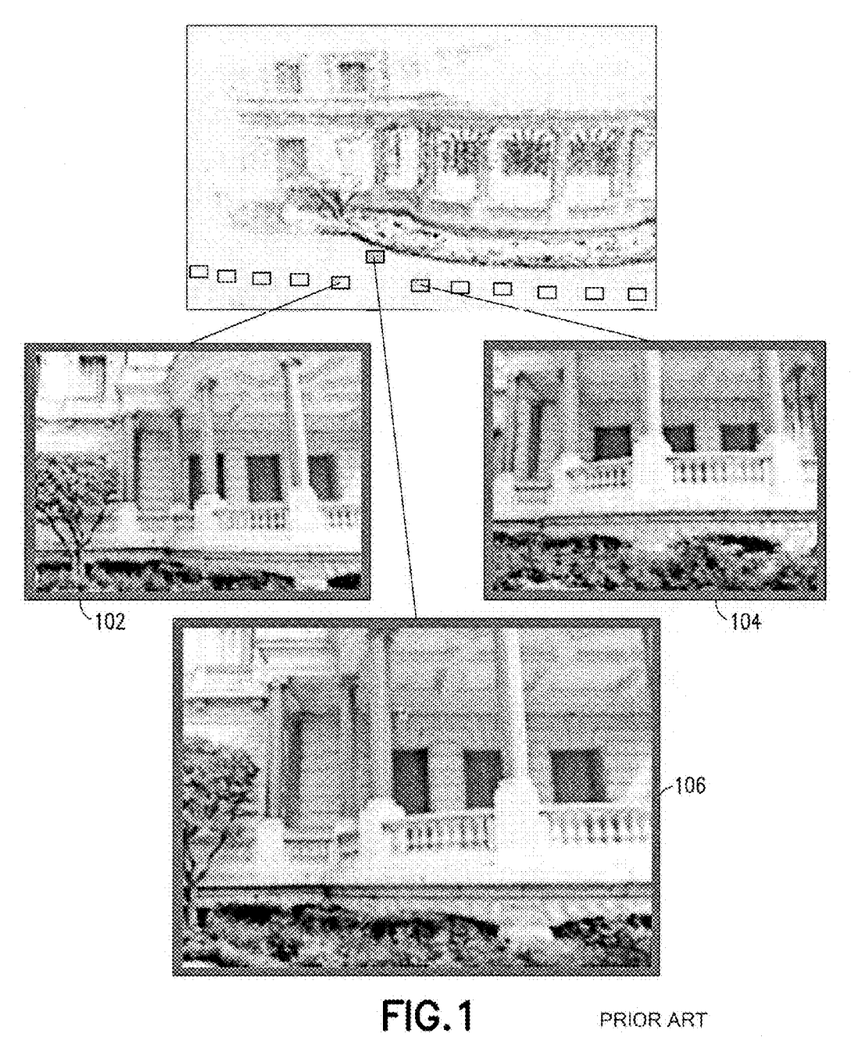
FIG. 1 presents an example of view interpolation.

For example, FIG. 1 shows two views of a building taken from two different positions, which are a left view 102 and a right view 104, and a combined view 106 which provides a new view of the building from a viewpoint between those of the left view and the right view 104. The combined view 106 is generated using elements taken from each of the two original views 102, 104.

Figure 2:
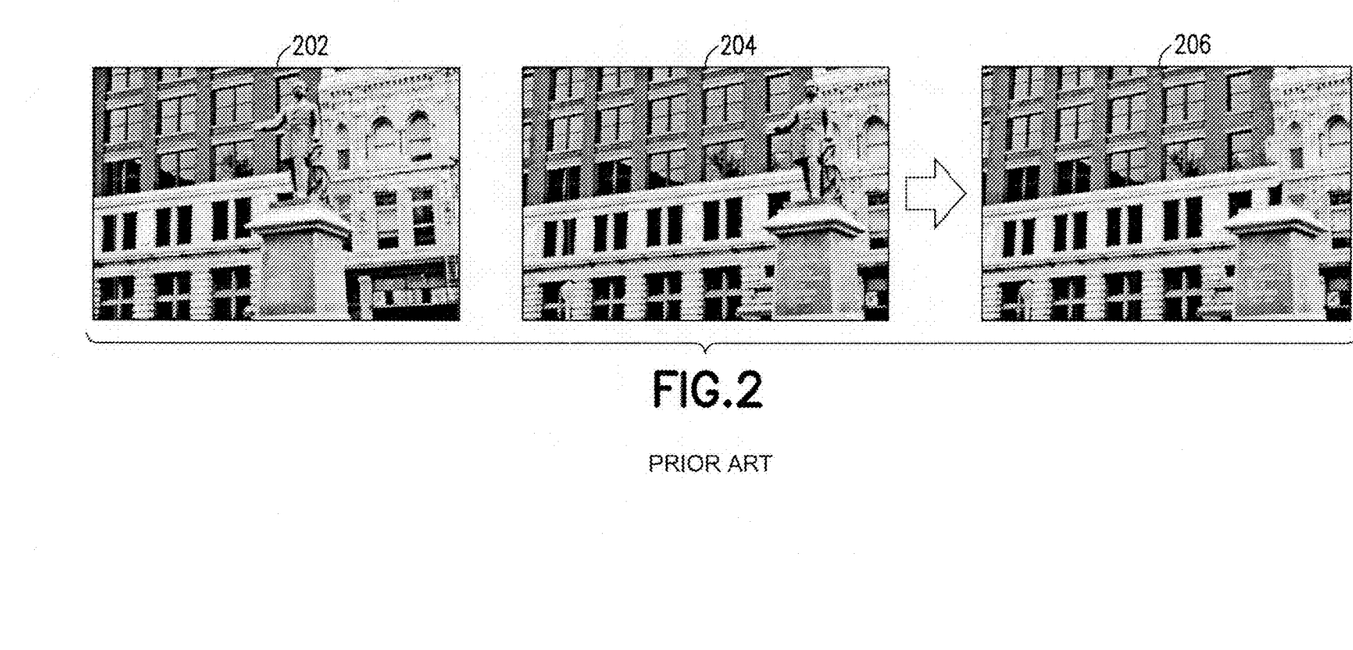
FIG. 2 presents an example of image in-painting.

By way of contrast, the goal of image in-painting from two images is to fill a region in one of the images with corresponding information from the other image. For example, referring to FIG. 2, the statue blocks part of the building in the left image 202, but that part of the building is visible in the middle image 204. By using image in-painting, information from the middle image 204, blocked by the statue in the left image 202, is transferred to the left image 202 to permit the removal of the statue and its replacement with information from the middle image to produce the right image 206.

Figure 3:
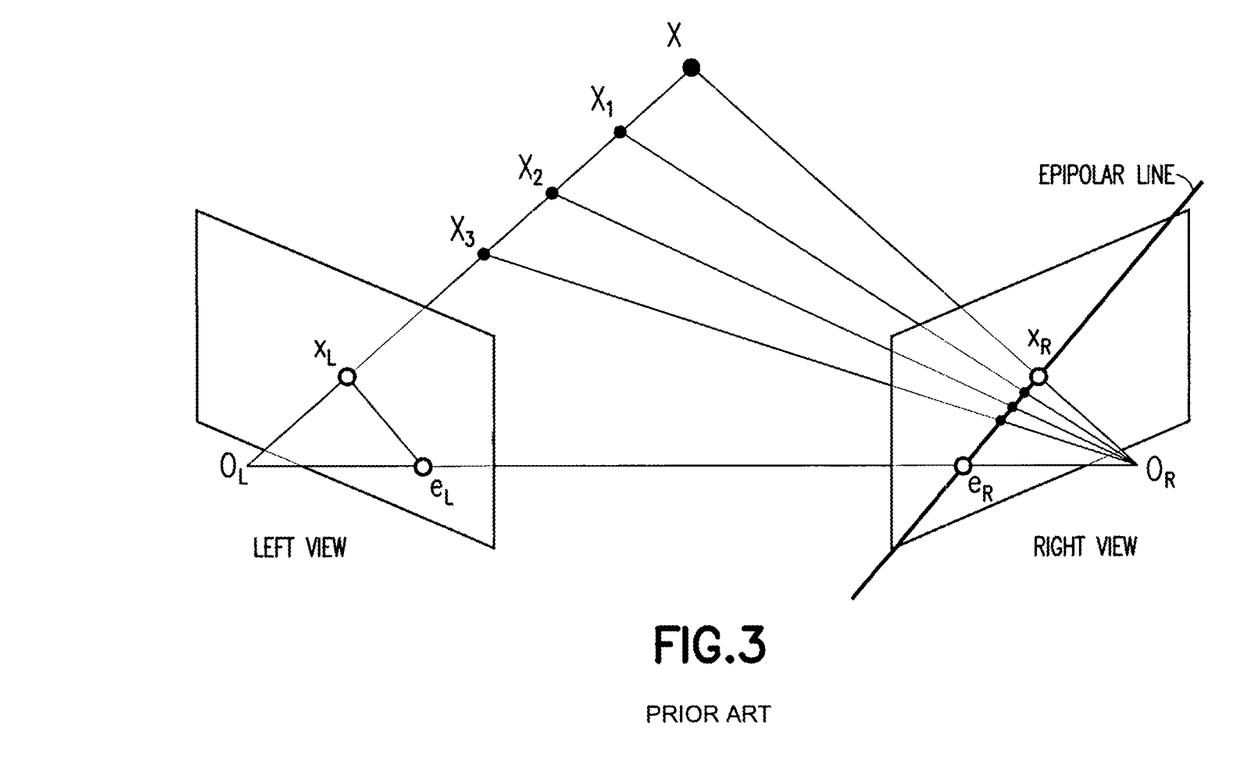
FIG. 3 illustrates the geometry of a stereo pair, also called epipolar geometry.

View interpolation and image in-painting are related to traditional stereo imaging, in which two views are used to infer three-dimensional information about a scene. FIG. 3 illustrates the geometry of a stereo pair, also called epipolar geometry. Given a point X in the world, imaged at $x_L$ in the left view, the corresponding location $x_R$ of X in the right view is found, and triangulating this point correspondence gives the depth of X. The problem of finding the correspondence, that is, which point $x_R$ from the right view corresponds to $x_L$, is central to stereo imaging. It is known from epipolar geometry that $x_R$ should lie along a specific line in the right view, the epipolar line, and this line can be computed from the relative geometry of both views, which, in turn, can be computed using a calibration procedure. This property is useful, since it implies that the search for $x_R$ across the right view can be simply conducted along the epipolar line, rather than looking for $x_R$ across the entire right view.

Figure 4:
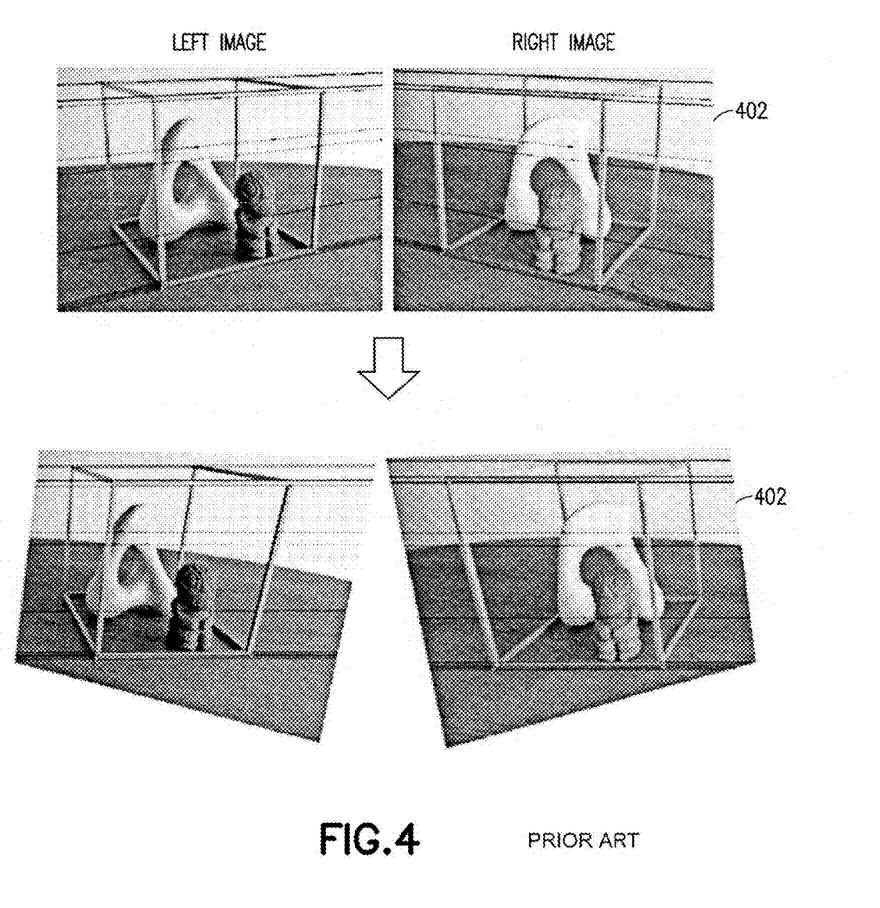
FIG. 4 illustrates a rectification procedure on a stereo pair of images.

Another useful procedure is called rectification. Referring to FIG. 4, where, given the geometry of the stereo pair in the top two pictures, both images are warped so that epipolar lines become parallel and horizontal. In this way, the search for correspondences is reduced to traversing the pixels of a scanline of the image. In other words, the search for correspondences becomes a one-dimensional search along a horizontal scanline.

The aforementioned task of finding the point correspondences between images is typically performed by minimizing a similarity measure between pixels; in other words, assuming the image pair, given by images $f_1(x,y)$ and $f_2(x,y)$, has been rectified, so that the corresponding points are on the same scanline, and therefore have the same y coordinate value, the goal is to minimize a matching cost $D(x_1,x_2,y)$ of pixels $f_1(x_1,y)$ and $f_2(x_2,y)$. By minimizing the matching cost, as measured by mathematical algorithms used for this purpose by those of ordinary skill in the art, one is optimizing the match to obtain the best solution. For example, D may be defined as the sum of squared differences in a 3×3 pixel patch around $f_1(x_1,y)$ and $f_2(x_2,y)$. However, in practice, this process may become quite challenging due to several issues, such as occlusion, where a point is visible in one of the images but is not visible in the other image; textureless areas, where a point could be matched to several points having a similar appearance; and repeating structures, where, as with textureless areas, there may be multiple similar candidates for matching the point.

In typical stereo matching for three-dimensional reconstruction of the prior art, the goal is to minimize the measured error against a ground truth disparity, where disparity is defined as the distance in pixels between the location of a point P in image 1 and its corresponding location in image 2 along the corresponding scanline.

A possible way to find a match for $f_1(x_1,y)$ is to search for pixels in the corresponding scanline on a neighborhood around $(x_1,y)$ in $f_2$, that is, the neighborhood going from $f_2(x_1,y)$ to $f_2(x_1+k,y)$. The search looks for the pixel $x_2$ that minimizes a matching cost $D(x_1,x_2,y)$ for the pixels in the neighborhood.

A better approach is to perform a global match along the scanline. This can be done in the following way:

Let $P=((x_1,x_2)_1; (x_1,x_2)_2; (x_1,x_2)_3; \ldots)$ be a sequence of correspondences along a scanline. These sequences are assumed to be monotonically increasing such that the correspondences are unique (no two pixels on one stereo image correspond to the same pixel in the other image) and in order (if an object is to the left of another in one stereo image, it is also to the left in the other image).

As an example, assume each image has 6 pixels on the scanline. A possible sequence of correspondences from the first pixel to the last is:

((1,1); (2,3); (3,4); (4,5); (6,6))

This path can be visualized as follows:

|   | 1 | 2 | 3 | 4 | 5 | 6 |
|---|---|---|---|---|---|---|
| 1 | X |   |   |   |   |   |
| 2 |   |   | X |   |   |   |
| 3 |   |   |   | X |   |   |
| 4 |   |   |   |   | X |   |
| 5 |   |   |   |   |   |   |
| 6 |   |   |   |   |   | X |

Note that the coordinates denote the x coordinate on images 1 and 2, respectively; the images are assumed to be rectified so the y coordinate on both is the same.

Each unmatched pixel is penalized with a cost E; in general $E > D(x_1, x_2, y)$. In this example, there are two unmatched pixels (pixel #2 on one image and pixel #5 on the other image).

As a consequence, the total difference along this sequence would be:

$$D(1,1,y)+D(2,3,y)+D(3,4,y)+D(4,5,y)+D(6,6,y)+2E$$

Let us define $Dp(x_{start1}, x_{start2}, x_{end1}, x_{end2}, y)$ as the minimum total difference sequence from $(x_{start1}, x_{start2}, y)$, $(x_{end1}, x_{end2}, y)$, that is, the minimum total difference sequence for the segments $[(x_{start1}, y), \ldots, (x_{end1}, y)]$ in image 1, and $[(x_{start2}, y), \ldots, (x_{end2}, y)]$ in image 2. If the sequence is limited to be monotonically increasing, the minimum sequence can be found efficiently using a technique called Dynamic Programming. This is known prior art in stereo matching on a scanline, as shown, for example, in Section 11.5.1 of Szeliski, Computer Vision: Algorithms and Applications, Springer 2010, the teachings of which are incorporated herein by reference. With this technique, the quality improves due to the ordering constraint imposed by the matching procedure, but visible artifacts are generally still present.

SUMMARY

This section contains examples of possible implementations and is not meant to be limiting.

In an exemplary embodiment, a method comprises taking a first image of a subject from a first viewpoint, where the first image of the subject is composed of a first plurality of pixels. The method further comprises taking a second image of the subject from a second viewpoint, where the second image of the subject is composed of a second plurality of pixels. Pixels in the first plurality of pixels in the first image correspond to pixels in the second plurality of pixels in the second image. The corresponding pixels lie on first epipolar lines in the first image and on second epipolar lines in the second image.

The first and second images are rectified to make the first and second epipolar lines parallel to one another and to place corresponding pixels in the first and second images on one of a plurality of pairs of common scanlines. For at least one pair of common scanlines, a corresponding pixel is found in the second image for each pixel in the first image such that a visual perception matching cost (VAMC) is minimized, wherein the visual perception matching cost is defined as $$VPMC(x_1,x_2,y)=Dp(1,1,x_1-1,x_2-1,y)+D(x_1,x_2,y)+Dp(x_1+1,x_2+1,x_{max1},x_{max2},y),$$

where $(x_1,y)$ are the coordinates of the pixels in the first image; $(x_2,y)$ are the coordinates of the pixels in the second image; y is a constant for all pixels in a given scanline; $Dp(1, 1, x_1-1, x_2-1, y)$ is a minimum total difference sequence and models how well the scanlines match on one side of $x_1$ and $x_2$; $Dp(x_1+1, x_2+1, x_{max1}, x_{max2}, y)$ is a minimum total difference sequence and models how well the scanlines match on the other side of $x_1$ and $x_2$; $x_{max1}$ and $x_{max2}$ are the maximum values of $x_1$ and $x_2$; and $D(x_1,x_2,y)$ is the local matching cost.

According to another aspect, an apparatus comprises one or more processors, and one or more memories including computer program code. The one or more memories and the computer program code are configured, with the one or more processors, to cause the apparatus to perform the method described above.

According to still another aspect, an apparatus comprises means for performing each step of the method described above.

According to yet another aspect, a computer program product comprises a computer-readable storage medium bearing computer program code embodied therein for use with a computer, the computer program code comprising code for performing the method described above.

DETAILED DESCRIPTION OF THE DRAWINGS

In contrast with the prior-art techniques described above, various embodiments are concerned with finding the best perceptual match (compare perceptual vs. objective image quality metrics), that is, the match that maximizes the visual quality of the output image in the target application, such as, view interpolation or image in-painting.

Accordingly, in various embodiments, a new cost for associating pixel $(x_1,y)$ on image 1 to pixel $(x_2,y)$ on image 2 is defined. Using the notation introduced above, the present Visual Perception Matching Cost is defined to be:

$$VPMC(x_1,x_2,y)=Dp(1,1,x_1-1,x_2-1,y)+D(x_1,x_2,y)+Dp(x_1+1,x_2+1,x_{max1},x_{max2},y),$$

where $x_{max1}$ and $x_{max2}$ are the maximum possible values of x in each image (in the example from the table above, $x_{max1}=x_{max2}=6$).

In the prior-art examples, as discussed above, the cost function is defined solely as $D(x_1,x_2,y)$, the local matching cost. However, in accordance with various embodiments, two new terms, based on the minimum total difference sequence described above, are added to the cost function: $Dp(1, 1, x_1-1, x_2-1, y)$, which models how well the scanlines match to the left of $x_1$ and $x_2$, and $Dp(x_1+1, x_2+1, x_{max1}, x_{max2}, y)$, which models how well the scanlines match to the right of $x_1$ and $x_2$.

Figure 5:
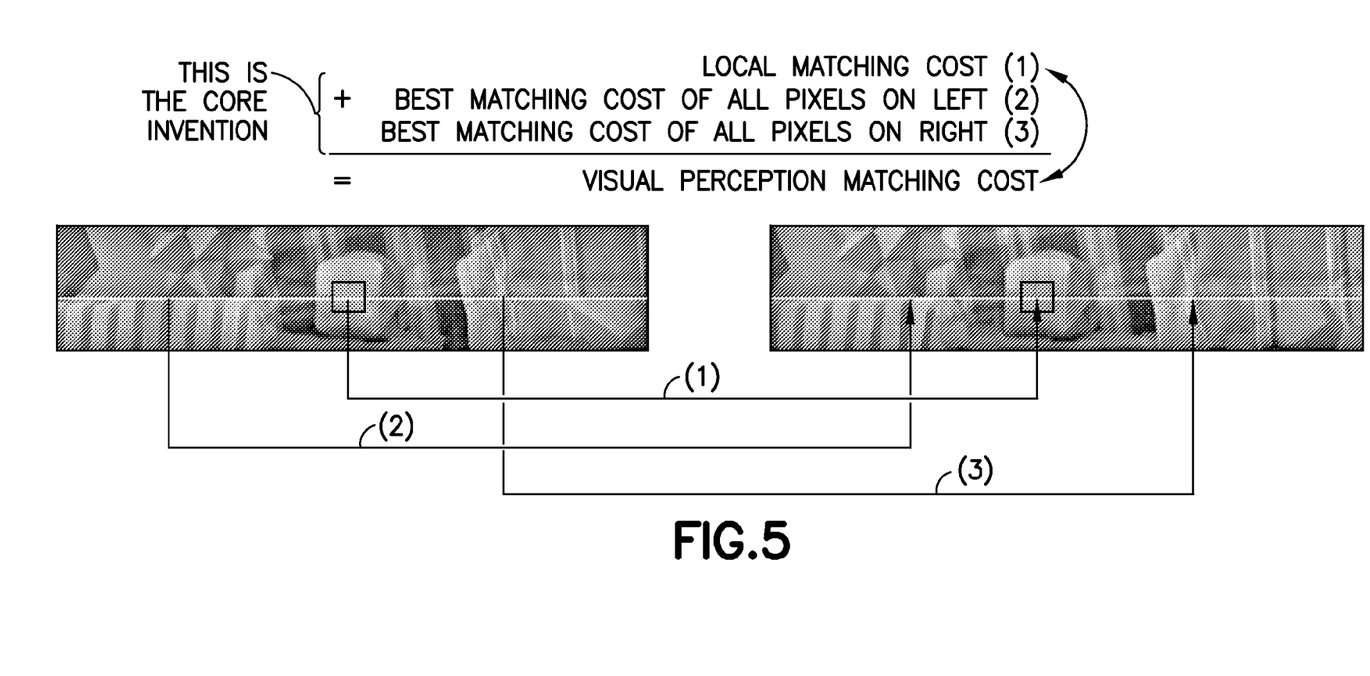
FIG. 5 illustrates the Visual Perception Matching Cost.

Referring to FIG. 5, in the prior art the cost function, $D(x_1,x_2,y)$, alone is optimized to find the best match, $x_2$, for pixel $x_1$, which are represented by squares on the left $(x_1)$ and right $(x_2)$ sides of the figure. In various embodiments, the two additional terms account for the pixels to the left and right of $x_1$, and, using Dynamic Programming techniques, all of those pixels are matched to corresponding pixels in the second image, and the Visual Perception Matching Cost for every pixel $x_1$ is minimized to determine the best match $x_2$. The quality of the results obtained is significantly improved when compared to the prior-art methods.

The local matching cost D can be implemented as many well-known template matching costs, such as the Sum of Squared Differences (SSD) or Cross Correlation, and Normalized Cross Correlation (NCC), but is not so limited. Combinations of these matching costs can also be used. Currently, the most promising local matching cost is SSD/NCC on the Lab color space. The local matching cost is computed by sampling the pixel at half pixel and one pixel to reduce camera decimation artifacts.

One exemplary implementation utilizes dynamic programming to compute the minimum total difference sequence Dp, as presented in Section 11.5.1 of Szeliski, Computer Vision: Algorithms and Applications, Springer 2010. For each scanline, two dynamic programming tables are computed, one in forward order to store $Dp(1, 1, x_1-1, x_2-1, y)$, that is, left to right, and the other in backward order to store $Dp(x_1+1, x_2+1, x_{max1}, x_{max2}, y)$, that is, right to left. However, other measurements can be used to compute Dp, such as block-based histograms.

For each pixel $(x_1, y)$ on the left image, the exemplary implementation selects pixel $(x_2, y)$ on the right image as the correspondence that minimizes $VPMC(x_1, x_2, y)$. This straightforward procedure cannot handle thin foreground objects, which can be detected by checking the local matching cost D again, that is, if $D(x_1, x_2, y)$>threshold, then $(x_1, y)$ potentially belongs to a thin foreground object.

Possible applications for the present technique are for view interpolation and for image in-painting. In the latter, pixels in a second image are replaced with corresponding pixels from a first image to fill out a missing portion of the second image.

In an exemplary embodiment for a view interpolation application, the pixel correspondences are found from the left image to the right image, and from the right image to the left image. That is to say, the interpolation is done twice, once for the right image and once for the left image. The correspondence map then contains distances that represent how much each pixel shifts to get to its position in the other image. To interpolate between both views, the positions for the pixels in the middle view are generated by linear interpolation for the left-right correspondence map and the right-left correspondence map, and then both images are combined to eliminate occluded regions.

Expressed in a slightly different manner, for at least one pair of common scanlines, a pixel in a second image is shifted by a distance proportional to the disparity between the pixel and a pixel corresponding thereto in a first image to produce a warped second image, and a pixel in the first image is shifted by a distance proportional to the disparity between the pixel and a pixel corresponding thereto in the second image to produce a warped first image. The warped first and second images are subsequently combined to obtain an interpolated view from a location between the capture locations of said first and second images.

In an exemplary embodiment for a stereoscopic image in-painting application, assume that there exists a mask (either provided by the user, or automatically computed) for the object to be removed (in-painted region) in the target view. Then, VPMC is used to find the corresponding pixels for the object in the source view. Pixels in the in-painted regions (in both views) are treated as unknown color pixels and they are allowed to be matched with any other pixels with zero local matching cost (D=0). VPMC is used again to find the correspondence of the boundaries of the in-painted region. The region within the boundary is copied from the source to the target view.

The proposed matching cost results in perceptually better quality results. The quality is significantly improved when compared to the previous methods. Compared with using local matching cost only $(D(x_1, x_2, y))$, VPMC can reduce ambiguity in homogenous regions. Specifically, in homogeneous regions, for example, in regions of solid color, the local cost D may be the same for different matches, because local texture makes it difficult to choose the best match, causing ambiguity.

However, when using the present Visual Perception Matching Cost, the minimum total difference sequence Dp may contribute different costs to the left and right of the matched pixels if the matched pixels are not in the same relative positions in the two images. Putting the costs D and Dp together can represent a perceptual fact that two pixels should be matched together if they are similar (low local matching cost D) as well as their relative positions result in a good global match for the pixels to their left, and the pixels to their right (low Dp). Thus, the sum of D and Dp is referred to as Visual Perception Matching Cost (VPMC).

Compared with using traditional dynamic programming, Visual Perception Matching Cost is more flexible to quantify the matching quality in occlusion regions, which are very critical for view interpolation and stereoscopic image in-painting tasks, as most of the visible artifacts in the dynamic programming result appear in occlusion regions. Dynamic Programming cannot find correspondences in occluded regions, while the present Visual Perception Matching Cost is able to return a matching cost for occluded pixels. The matching with minimum Visual Perception Matching Cost in occlusion regions aims to generate a visually plausible output rather than a true depth map.

The proposed Visual Perception Matching Cost can be efficiently computed, as described above, and has several applications:

View interpolation: VPMC can be used directly; for each pixel use the correspondence defined by minimum VPMC.

Image in-painting using secondary image from a different viewpoint: Find matches along the boundary of area to be in-painted, enforcing smoothness of the boundary.

Video in-painting: As in image in-painting before, but enforce also temporal smoothness.

Figure 6:
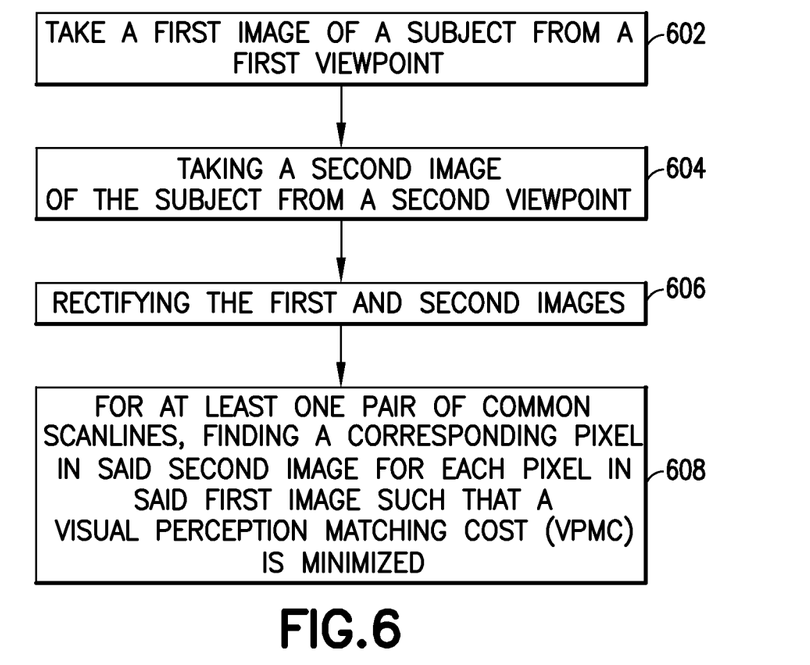
FIG. 6 is a flowchart illustrating the method in accordance with an exemplary embodiment.

FIG. 6 is a flowchart illustrating the method in accordance with an exemplary embodiment. In block 602, a first image of a subject is taken from a first viewpoint. The first image of the subject is composed of a first plurality of pixels.

In block 604, a second image of the subject is taken from a second viewpoint. The second image of said subject is composed of a second plurality of pixels. The pixels in the first plurality of pixels in the first image correspond to pixels in the second plurality of pixels in the second image. Corresponding pixels lie on first epipolar lines in the first image and on second epipolar lines in the second image.

In block 606, the first and second images are rectified to make the first and second epipolar lines parallel to one another and to place corresponding pixels in the first and second images on one of a plurality of pairs of common scanlines.

In block 608, for at least one pair of common scanlines, a corresponding pixel is found in the second image for each pixel in the first image such that a visual perception matching cost (VPMC) is minimized.

Figure 7:
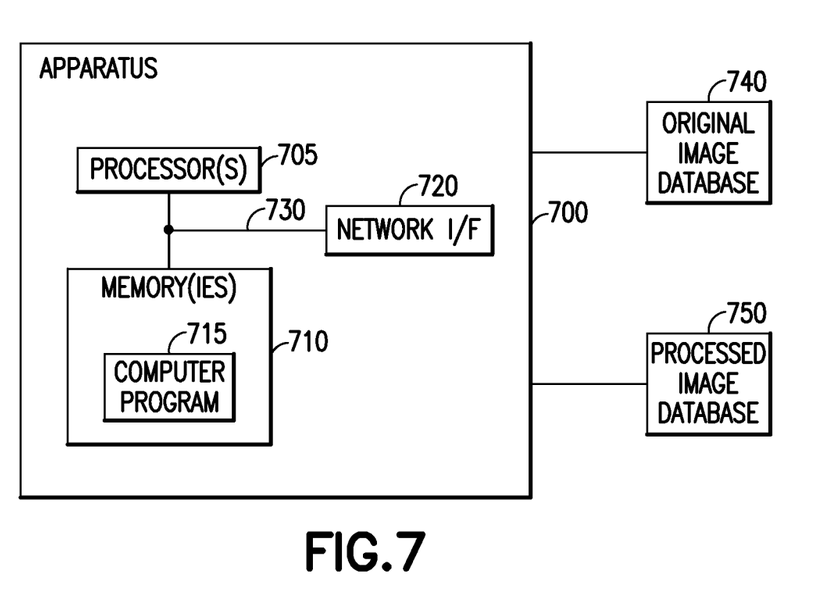
FIG. 7 is an exemplary system for practicing various exemplary embodiments.

FIG. 7 shows an exemplary system for practicing various embodiments. The system includes an apparatus 700 having one or more processors 705, one or more memories 710, and one or more network interfaces 720, interconnected using one or more buses 730. The one or more memories 710 include a computer program 715 defined to cause the apparatus to perform one or more of the operations described herein. Left and right images are obtained from an original image database 740 and are input into the apparatus 700. In turn, the apparatus 700 performs the process necessary to find corresponding points between the left and right images using the visual perception matching cost (VPMC) as described above, to use these correspondences on a desired application (such as view interpolation and image in-painting), and to store the results in a processed image database 750.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, and so forth, or any suitable combination of the foregoing.

Computer program code for carrying out operations for aspects of the present invention may be written in any combination of one or more programming languages, including an object-oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable-medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any and all means or step plus function elements in the claims below are intended to include any structure, material, or act for performing the function in combination with other claimed elements as specifically claimed. The description of various embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method comprising:
taking a first image of a subject from a first viewpoint, said first image of said subject being composed of a first plurality of pixels;
taking a second image of the subject from a second viewpoint, said second image of said subject being composed of a second plurality of pixels, wherein pixels in said first plurality of pixels in said first image correspond to pixels in said second plurality of pixels in said second image, said corresponding pixels lying on first epipolar lines in said first image and on second epipolar lines in said second image;
rectifying said first and second images to make said first and second epipolar lines parallel to one another and to place corresponding pixels in said first and second images on one of a plurality of pairs of common scanlines; and
for at least one pair of common scanlines, finding a corresponding pixel in said second image for each pixel in said first image such that a visual perception matching cost (VPMC) is minimized,
wherein the visual perception matching cost (VPMC) is a function of:
a local matching cost for the corresponding pixels on the pair of common scanlines in said first image and said second image;
a minimum total difference sequence modeling how well the common scanlines match on one side of the corresponding pixels in said first image and said second image; and
a minimum total difference sequence modeling how well the common scanlines match on the other side of the corresponding pixels in said first image and said second image.

2. The method as claimed in claim 1, wherein finding a corresponding pixel in said second image for each pixel in said first image such that a visual perception matching cost (UPMC) is minimized is carried out for each pair of common scanlines.

3. The method as claimed in claim 1, wherein said visual perception matching cost is defined as $$VPMC(x_1,x_2,y)=Dp(1,1,x_1-1,x_2-1,y)+D(x_1,x_2,y)+Dp(x_1+1,x_2+1,x_{max1},x_{max2},y),$$

where $(x_1,y)$ are the coordinates of the pixels in the first image; $(x_2,y)$ are the coordinates of the pixels in the second image; y is a constant for all pixels in a given scanline; $Dp(1, 1, x_1-1, x_2-1, y)$ is a minimum total difference sequence and models how well the scanlines match on one side of $x_1$ and $x_2$; $Dp(x_1+1, x_2+1, x_{max1}, x_{max2},y)$ is a minimum total difference sequence and models how well the scanlines match on the other side of $x_1$ and $x_2$; $x_{max1}$ and $x_{max2}$ are the maximum values of $x_1$ and $x_2$; and $D(x_1,x_2,y)$ is the local matching cost.

4. The method as claimed in claim 3, wherein the local matching cost is implemented as one of the sum of squared differences (SSD), cross correlation, and normalized cross correlation (NCC).

5. The method as claimed in claim 3, wherein the local matching cost is implemented as a combination of the sum of squared differences (SSD) and normalized cross correlation (NCC).

6. The method as claimed in claim 3, wherein the minimum total difference sequence is computed using dynamic programming.

7. The method as claimed in claim 1, further comprising:
for at least one pair of common scanlines, replacing pixels in said second image with corresponding pixels in said first image to fill out a missing portion of said second image by image in-painting.

8. The method as claimed in claim 1, further comprising:
for at least one pair of common scanlines, shifting a pixel in said second image by a distance proportional to the disparity between said pixel and a pixel corresponding thereto in said first image to produce a warped second image, and shifting a pixel in said first image by a distance proportional to the disparity between said pixel and a pixel corresponding thereto in said second image to produce a warped first image; and
combining the warped first and second images to obtain an interpolated view from a location between the capture locations of said first and second images.

9. An apparatus comprising:
one or more processors; and
one or more memories including computer program code, the one or more memories and the computer program code configured, with the one or more processors, to cause the apparatus to perform:
taking a first image of a subject from a first viewpoint, said first image of said subject being composed of a first plurality of pixels;
taking a second image of the subject from a second viewpoint, said second image of said subject being composed of a second plurality of pixels, wherein pixels in said first plurality of pixels in said first image correspond to pixels in said second plurality of pixels in said second image, said corresponding pixels lying on first epipolar lines in said first image and on second epipolar lines in said second image;
rectifying said first and second images to make said first and second epipolar lines parallel to one another and to place corresponding pixels in said first and second images on one of a plurality of pairs of common scanlines; and
for at least one pair of common scanlines, finding a corresponding pixel in said second image for each pixel in said first image such that a visual perception matching cost (VPMC) is minimized,
wherein the visual perception matching cost (VPMC) is a function of:
a local matching cost for the corresponding pixels on the pair of common scanlines in said first image and said second image;

a minimum total difference sequence modeling how well the common scanlines match on one side of the corresponding pixels in said first image and said second image; and a minimum total difference sequence modeling how well the common scanlines match on the other side of the corresponding pixels in said first image and said second image.

10. The apparatus as claimed in claim 9, wherein finding a corresponding pixel in said second image for each pixel in said first image such that a visual perception matching cost (VPMC) is minimized is carried out for each pair of common scanlines.

11. The apparatus as claimed in claim 9, wherein said visual perception matching cost is defined as $$VPMC(x_1,x_2,y)=Dp(1,1,x_1-1,x_2-1,y)+D(x_1,x_2,y)+Dp(x_1+1,x_2+1,x_{max1},x_{max2},y),$$

where $(x_1,y)$ are the coordinates of the pixels in the first image; $(x_2,y)$ are the coordinates of the pixels in the second image; y is a constant for all pixels in a given scanline; $Dp(1, 1, x_1-1, x_2-1, y)$ is a minimum total difference sequence and models how well the scanlines match on one side of $x_1$ and $x_2$; $Dp(x_1+1, x_2+1, x_{max1}, x_{max2},y)$ is a minimum total difference sequence and models how well the scanlines match on the other side of $x_1$ and $x_2$; $x_{max1}$ and $x_{max2}$ are the maximum values of $x_1$ and $x_2$; and $D(x_1,x_2,y)$ is the local matching cost.

12. The apparatus as claimed in claim 11, wherein the local matching cost is implemented as one of the sum of squared differences (SSD), cross correlation, and normalized cross correlation (NCC).

13. The apparatus as claimed in claim 11, wherein the local matching cost is implemented as a combination of the sum of squared differences (SSD) and normalized cross correlation (NCC).

14. The apparatus as claimed in claim 11, the minimum total difference sequence is computed using dynamic programming.

15. The apparatus as claimed in claim 9, wherein the one or more memories and the computer program code are further configured, with the one or more processors, to cause the apparatus to perform:

for at least one pair of common scanlines, replacing pixels in said second image with corresponding pixels in said first image to fill out a missing portion of said second image by image in-painting.

16. The apparatus as claimed in claim 9, wherein the one or more memories and the computer program code are further configured, with the one or more processors, to cause the apparatus to perform:

for at least one pair of common scanlines, shifting a pixel in said second image by a distance proportional to the disparity between said pixel and a pixel corresponding thereto in said first image to produce a warped second image, and shifting a pixel in said first image by a distance proportional to the disparity between said pixel and a pixel corresponding thereto in said second image to produce a warped first image; and combining the warped first and second images to obtain an interpolated view from a location between the capture locations of said first and second images.

17. A computer program product comprising a non-transitory computer-readable storage medium bearing computer program code embodied therein for use with an apparatus, the computer program code comprising code for performing at least the following:

taking a first image of a subject from a first viewpoint, said first image of said subject being composed of a first plurality of pixels;

taking a second image of the subject from a second viewpoint, said second image of said subject being composed of a second plurality of pixels, wherein pixels in said first plurality of pixels in said first image correspond to pixels in said second plurality of pixels in said second image, said corresponding pixels lying on first epipolar lines in said first image and on second epipolar lines in said second image;

rectifying said first and second images to make said first and second epipolar lines parallel to one another and to place corresponding pixels in said first and second images on one of a plurality of pairs of common scanlines; and for at least one pair of common scanlines, finding a corresponding pixel in said second image for each pixel in said first image such that a visual perception matching cost (VPMC) is minimized, wherein the visual perception matching cost (VPMC) is a function of:

a local matching cost for the corresponding pixels on the pair of common scanlines in said first image and said second image;

a minimum total difference sequence modeling how well the common scanlines match on one side of the corresponding pixels in said first image and said second image; and a minimum total difference sequence modeling how well the common scanlines match on the other side of the corresponding pixels in said first image and said second image.

18. The computer program product as claimed in claim 17, wherein finding a corresponding pixel in said second image for each pixel in said first image such that a visual perception matching cost (UPMC) is minimized is carried out for each pair of common scanlines.

19. The computer program product as claimed in claim 17, wherein said visual perception matching cost is defined as $$VPMC(x_1,x_2,y)=Dp(1,1,x_1-1,x_2-1,y)+D(x_1,x_2,y)+Dp(x_1+1,x_2+1,x_{max1},x_{max2},y),$$

where $(x_1,y)$ are the coordinates of the pixels in the first image; $(x_2,y)$ are the coordinates of the pixels in the second image; y is a constant for all pixels in a given scanline; $Dp(1, 1, x_1-1, x_2-1, y)$ is a minimum total difference sequence and models how well the scanlines match on one side of $x_1$ and $x_2$; $Dp(x_1+1, x_2+1, x_{max1}, x_{max2},y)$ is a minimum total difference sequence and models how well the scanlines match on the other side of $x_1$ and $x_2$; $x_{max1}$ and $x_{max2}$ are the maximum values of $x_1$ and $x_2$; and $D(x_1,x_2,y)$ is the local matching cost.

20. The computer program product as claimed in claim 19, wherein the local matching cost is implemented as one of the sum of squared differences (SSD), cross correlation, and normalized cross correlation (NCC).

21. The computer program product as claimed in claim 19, wherein the local matching cost is implemented as a combination of the sum of squared differences (SSD) and normalized cross correlation (NCC).

22. The computer program product as claimed in claim 19, wherein the minimum total difference sequence is computed using dynamic programming.

23. The computer program product as claimed in claim 17, further comprising code for performing:
   for at least one pair of common scanlines, replacing pixels in said second image with corresponding pixels in said first image to fill out a missing portion of said second image by image in-painting.

24. The computer program product as claimed in claim 17, further comprising code for performing:
   for at least one pair of common scanlines, shifting a pixel in said second image by a distance proportional to the disparity between said pixel and a pixel corresponding thereto in said first image to produce a warped second image, and shifting a pixel in said first image by a distance proportional to the disparity between said pixel and a pixel corresponding thereto in said second image to produce a warped first image; and
   combining the warped first and second images to obtain an interpolated view from a location between the capture locations of said first and second images.

* * * * *